United States Patent [19]
Basavanhally et al.

[11] Patent Number: 6,106,161
[45] Date of Patent: Aug. 22, 2000

[54] OPTICAL SUB-ASSEMBLY PACKAGE MOUNT

[75] Inventors: Nagesh R. Basavanhally, Trenton, N.J.; Michael F. Brady, Morrisville, Pa.

[73] Assignee: Lucent Technologies, Inc., Murray Hill, N.J.

[21] Appl. No.: 09/153,386

[22] Filed: Sep. 15, 1998

[51] Int. Cl.[7] ............................................. G02B 6/36
[52] U.S. Cl. ........................................ 385/88; 385/93
[58] Field of Search .................................... 385/88–94

[56] References Cited

U.S. PATENT DOCUMENTS

| | | | |
|---|---|---|---|
| 5,416,869 | 5/1995 | Yoshino | 385/88 |
| 5,432,358 | 7/1995 | Nelson et al. | 257/81 |
| 5,499,312 | 3/1996 | Hahn et al. | 385/91 |
| 5,537,502 | 7/1996 | Patel et al. | 385/92 |
| 5,689,279 | 11/1997 | Nelson et al. | 345/82 |
| 5,700,987 | 12/1997 | Basavanhally | 219/56.1 |
| 5,845,030 | 12/1998 | Sasaki et al. | 385/88 |

OTHER PUBLICATIONS

N. Basavanhally, "Application of soldering technologies for opto–electronic component assembly," ASME Int. Electronic Packaging Conference, New York: ASME, 1993, pp. 1149–1155.

Y. C. Lee and N. Basavanhally, "Soldering engineering for optoelectronic packaging," J. Metals, Jun. 1994.

N. R. Basavanhally, M. F. Brady, and D. Bruce Buchholz, "Optoelectronic Packaging of Two–Dimensional Surface Active Devices," IEEE Transactions on Components, Packaging, and Manufacturing Technology—Part B, vol. 19, No. 1, Feb. 1996, pp. 107–115.

*Primary Examiner*—Hung N. Ngo
*Attorney, Agent, or Firm*—Synnestvedt & Lechner LLP

[57] ABSTRACT

Compliant, resilient mounting means are provided for minimizing stress on the platform of an optical sub-assembly package caused by temperature change and the like so as to maintain good alignment between the laser beam emitted from a laser chip mounted on the platform and the lens of an optical fiber also mounted on the platform. The resilient means comprise resilient solder bumps of the order of 625 microns thick interposed between the platform and the base to provide a resilient connection between the platform and the base, thereby maintaining good alignment between the laser beam and the lens by reducing the stresses on the optical sub-assembly platform that tend to be caused by temperature changes or the mounting of the package to a rigid, external platform, as by bolting.

14 Claims, 1 Drawing Sheet

OPTICAL SUB-ASSEMBLY PACKAGE MOUNT

FIELD OF THE INVENTION

This invention relates generally to optical sub-assemblies. More particularly it relates to the mounting of optical sub-assemblies (OSA's) in a package by means that provide sufficient resiliency to prevent or minimize distortion of the OSA and maintain proper optical alignment within the OSA when the package is subjected to mechanical stress caused by temperature changes, bolting the package to a rigid external platform and the like.

BACKGROUND OF THE INVENTION

Current pump laser packages typically include an optical sub-assembly that comprises a laser chip and an optical fiber that acts as a wave guide, both of which are mounted on a platform in proper optical alignment with each other. Often, the method employed to effect this alignment will depend on the degree of precision required (less precision is required for surface emitting lasers than for edge emitting lasers). For sub-assemblies comprising surface emitting lasers, where less precision is required, the alignment may be effected passively (e.g., using solder bumps and wettable pads, as taught, for example, in U.S. Pat. No. 5,499,312).

Bumps of solder (and other materials) have been used also to provide electrical conductivity in optical devices. Such use is disclosed, for example, in U.S. Pat. No. 5,689,279.

For applications where greater precision of alignment is required, as is the case for edge emitting laser chips, the alignment is effected actively, by activating the laser and moving it relative to the optical wave guide until maximum transmission is achieved. Once the alignment of laser to fiber is achieved, both the laser and the optical fiber are fixed to a platform, which is, in turn, mounted on a base, typically using solder to form a rigid joint. The fiber also is fixed to the package by using either welding or a solder joint to form a hermetic seal. The package base, in turn, is generally bolted to a rigid external platform. Such active alignment and bonding techniques are described in U.S. Pat. No. 5,700,987, the contents of which are hereby incorporated herein by reference.

The joint between the optical sub-assembly platform and the base serves as the main means for dissipating heat generated by the laser when it is being operated. Because of other structural requirements, the portion of the platform supporting the laser and the portion to which the fiber sheath is attached usually are formed of different materials. For example, the portion of the platform on which the laser chip is mounted can be beryllium oxide (BeO) whereas the portion of the platform to which the optical fiber sheath is attached may be Kovar. Also, the package base to which the optical sub-assembly platform is joined typically is made of yet another material, for example, copper/tungsten (CuW). Each of these materials has a different coefficient of expansion from that of the other materials. Upon heating or cooling of the package, the differential expansion or contraction causes stresses that tend to distort the sub-assembly platform. Any such distortion would tend to cause misalignment of the laser and fiber, thereby reducing the efficiency of the device. Similar stresses are typically created when the package base is bolted to an external platform. These stresses, too, tend to cause similar misalignment.

SUMMARY OF THE INVENTION

The present invention provides resilient mounting means for an optical sub-assembly so as to provide improved retention of alignment between the optical laser beam and the optical fiber lens on the sub-assembly by minimizing stresses on the sub-assembly platform. This enhanced alignment of the sub-assembly, in turn, enhances the efficiency of the device of which the sub-assembly is a part. Preventing misalignment is particularly important for optical sub-assemblies that employ edge-emitting laser devices. Thus, the tolerances for such devices are of the order of 0.2 to 0.3 microns.

In accordance with the invention, resilient solder bumps, typically of the order of 625 microns thick, are used to attach the sub-assembly platform to the package base. This mounting means, which is a substitute for the rigid solder connection of the typical prior art optical sub-assembly, provides similar heat transfer from the platform to the base as was provided by the rigid prior art mounting means, while, at the same time, providing sufficient resiliency in the connection between the base and the platform to minimize stress on the platform and thereby prevent or minimize misalignment between the optical laser beam and the lens of the optical fiber. The stress that otherwise would be transferred to the platform from the base could result from differential expansion or contraction due to temperature changes in the device or from forces arising from bolting or otherwise attaching the package base to a rigid external platform.

DETAILED DESCRIPTION OF THE INVENTION

Figure 1:
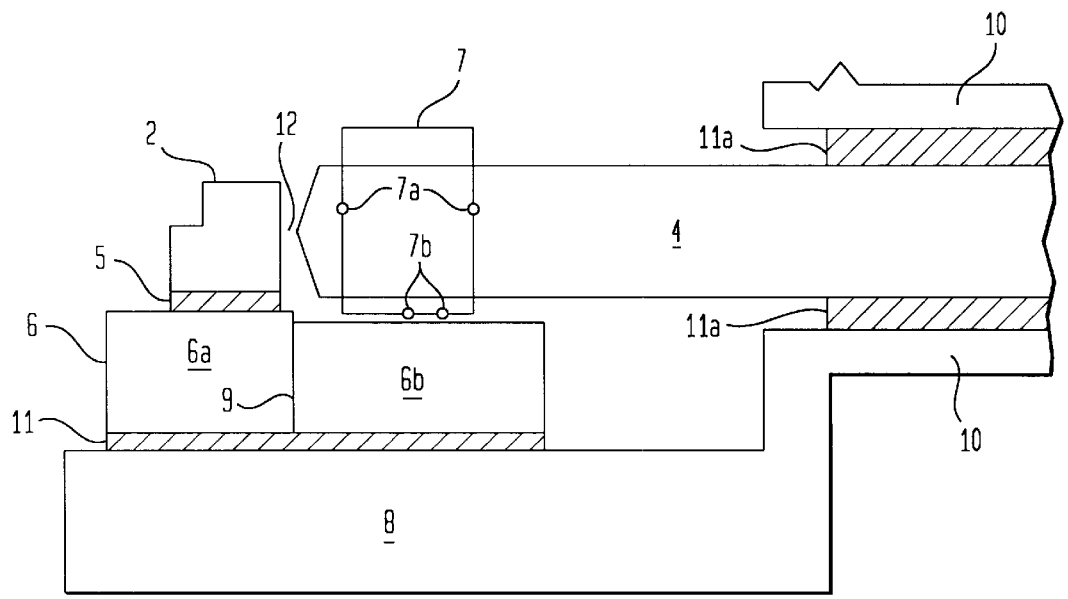
FIG. 1 is a sectional view showing an optical sub-assembly attached to a package base in accordance with the prior art.

As shown in FIG. 1, conventional pump laser packages contain an optical sub assembly (OSA) that includes a laser chip (2) and an optical fiber sleeve (4), both of which are mounted on a platform (6) by conventional means, such as solder joint (5) and clip (7). The clip (7), which is formed of a weldable metal such as Kovar, is attached to the fiber sleeve (4) by weld (7a). A similar weld (7b) is used to attach clip (7) to the platform (6b). Platform (6) is mounted on a package base (8) on which is provided a snout (10) to which metallic fiber sleeve (4) is fixed. In the conventional package of FIG. 1, the OSA is attached to the base by solder joint (11) between the platform and the base. The metallic fiber sleeve (4) and the snout (10) are joined to form a hermetic seal by solder joint or weld (11a).

For proper operation, there must be proper alignment between the laser beam emanating from the chip and the lens of the optical fiber (not shown). This alignment is depicted as being at point (12). As indicated above, for devices employing edge emitting laser chips, such as the depicted device, the tolerances for such alignment are typically of the order of 0.2 to 0.3 microns.

Solder joints (11), as currently employed in the OSA depicted in FIG. 1, are continuous, of the order of 125 microns thick, providing a rigid seal with good heat transfer properties. However, the rigidity of the seal creates too much inflexibility in the attachment between the OSA platform (6) and the base (8). Thus, platform (6) may be constructed of a BeO portion (6a) and a Kovar portion (6b), joined together as at interface (9) by brazing or other suitable means, whereas base (8) may be CuW. Each of these materials has its own, unique, coefficient of expansion. Therefore, stresses created by differential expansion or contraction due to temperature changes that occur during operation of the device cause stress distortion in the OSA, thereby disturbing the alignment at 12 and reducing the light coupling between the laser and the fiber. This, in turn, reduces the efficiency of the device.

Figure 2:
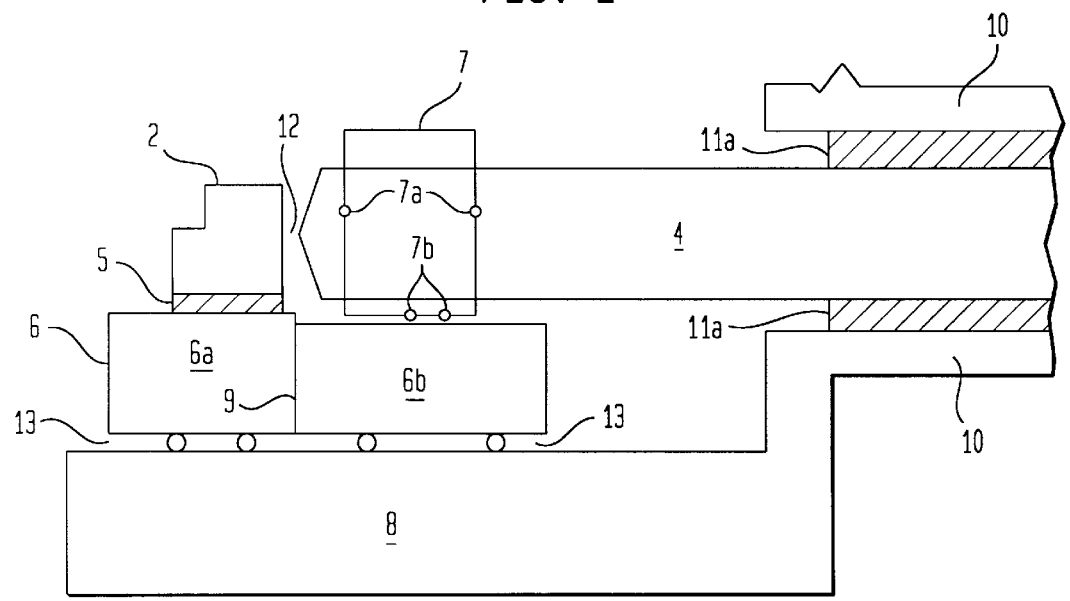
FIG. 2 is a section view similar to FIG. 1 but showing the attachment of the optical sub-assembly to the package base by solder bump mounting means in accordance with the present invention.

As shown in FIG. 2, by replacing the solder joint 11 with thicker (preferably of the order of 625 microns thick) solder bumps (13) in accordance with the present invention, the heat transfer properties between platform (6) and base (8) are maintained, but the rigid connection of the OSA platform (6) to the base (8) is replaced by a much more resilient one, which greatly reduces the stresses on the OSA platform. In this way, the proper alignment of the laser beam with the fiber lens is better maintained, thus improving the operating efficiency of the device.

In the practice of this invention, the solder bumps may vary in thickness between about 500 and about 750 microns. For best practical results, applicants have found that the solder bumps should be between about 600 and 650 microns thick, more preferably about 625 microns thick.

Preferably, they are uniformly distributed along the interface between platform (6) and base (8) at distances of from about 1250 to about 2500 microns from center to center, although patterns can vary. While other solder alloys may be usable, we have found that lead/tin/silver (Pb/Sn/Ag) alloys provide an excellent combination of heat transfer, bonding and resiliency properties. Other alloys that are suitable for the solder bumps include bismuth/tin (Bi/Sn), lead/tin (Pb/Sn) and indium/silver (In/Ag).

The solder bumps may be applied at the desired locations on the facing surfaces of platform (6) or base (8) by conventional means, such as by using commercially available solder preforms or solder balls.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

What is claimed is:

1. An optical sub-assembly package comprising:
   (A) a package base sub-assembly platform;
   (B) a light emitting laser chip;
   (C) said light emitting laser chip being adapted to emit light from an edge thereof;
   (D) an optical fiber assembly including an optical fiber lens for receiving light from said light emitting laser chip;
   (E) said light emitting laser chip and said optical fiber assembly being mounted on said platform in such manner as to provide proper alignment therebetween so as to maximize the amount of light from said chip that impinges on said lens; and
   (F) said sub-assembly platform being mounted to said package base by resilient mounting means.

2. The optical sub-assembly package of claim 1 wherein said resilient means comprises a multiplicity of solder bumps.

3. The Optical sub-assembly package of claim 2 wherein said solder bumps are from about 500 to about 750 microns in thickness.

4. The optical sub-assembly package of claim 3 wherein said solder bumps are from about 600 to about 650 microns in thickness.

5. The optical sub-assembly package of claim 2 wherein said solder bumps are comprised of a lead/tin/silver alloy.

6. The optical sub-assembly package of claim 3 wherein said solder bumps are spaced apart from each other at distances of from about 1250 to about 2500 microns from center to center.

7. An optical sub-assembly package comprising:
   (A) a package base sub-assembly platform;
   (B) a light emitting laser chip;
   (C) an optical fiber assembly including means for receiving light from said light emitting laser chip;
   (D) said light emitting laser chip and said optical fiber assembly being mounted on said platform in such manner as to provide proper alignment therebetween so as to maximize the amount of light from said chip that impinges on said light receiving means; and
   (E) said sub-assembly platform being mounted to said package base by resilient mounting means.

8. The optical sub-assembly package of claim 7 wherein said resilient means comprises a multiplicity of solder bumps.

9. The optical sub-assembly package of claim 8 wherein said solder bumps are from about 500 to about 750 microns in thickness.

10. The optical sub-assembly package of claim 9 wherein said solder bumps are from about 600 to about 650 microns in thickness.

11. The optical sub-assembly package of claim 8 wherein said solder bumps are comprised of a lead/tin/silver alloy.

12. The optical sub-assembly package of claim 7 wherein said light emitting laser chip is adapted to emit light from an edge thereof.

13. The optical sub-assembly package of claim 7 wherein said means for receiving light comprises an optical fiber lens on the end of the optical fiber assembly, said lens being so aligned with said laser chip as to receive substantially the maximum amount of light emitted from said laser chip.

14. The optical sub-assembly package of claim 9 wherein said solder bumps are spaced apart from each other at distances of from about 1250 to about 2500 microns from center to center.

* * * * *